United States Patent [19]
Sinko et al.

[11] Patent Number: 6,152,791
[45] Date of Patent: Nov. 28, 2000

[54] EXTERNAL ELECTRIC DRIVE PROPULSION MODULE ARRANGEMENT FOR SWATH VESSELS

[75] Inventors: Michael S. Sinko, Preston; James S. Smith, Old Lyme; Pieter Van Dine, Mystic; John H. Chapman, Groton, all of Conn.

[73] Assignee: Electric Boat Corporation, Groton, Conn.

[21] Appl. No.: 09/303,922

[22] Filed: May 3, 1999

[51] Int. Cl.[7] .................................................. B60L 11/02
[52] U.S. Cl. .............................. 440/6; 440/67; 114/61.12
[58] Field of Search ..................... 440/6, 67; 114/61.12, 114/61.13, 61.14, 337, 338, 283

[56] References Cited

U.S. PATENT DOCUMENTS

| | | |
|---|---|---|
| 3,143,972 | 8/1964 | Smith et al. . |
| 3,623,444 | 11/1971 | Lang ..................................... 114/61.14 |
| 3,708,251 | 1/1973 | Pierro . |
| 4,831,297 | 5/1989 | Taylor et al. . |
| 4,936,237 | 6/1990 | Walters . |
| 5,078,628 | 1/1992 | Garis, Jr. . |
| 5,252,875 | 10/1993 | Veronesi et al. . |
| 5,301,624 | 4/1994 | Hall et al. . |
| 5,679,037 | 10/1997 | Rieben . |

*Primary Examiner*—Sherman Basinger
*Attorney, Agent, or Firm*—BakerBotts, LLP

[57] ABSTRACT

In the embodiments described in the specification, a SWATH vessel has a superstructure supported by strut members from a pair of pontoons and each pontoon has a propulsion module removably attached to the rear end of the pontoon. The propulsion module has a self contained propulsion system including a module body with a longitudinal water passage, a rim drive electric motor, a row of rotatable blades, and an inlet opening at the forward end of he cowl member which is arranged to draw in the boundary layer of water flowing along the pontoon to which the propulsion module is attached. Spaced vanes are provided at the inlet opening to block objects from being drawn into the longitudinal passage.

11 Claims, 2 Drawing Sheets

EXTERNAL ELECTRIC DRIVE PROPULSION MODULE ARRANGEMENT FOR SWATH VESSELS

BACKGROUND OF THE INVENTION

This invention relates to propulsion arrangements for Small Waterplane Area Twin Hull (SWATH) vessels.

Conventional propulsion arrangements for SWATH vessels are generally shaft-driven propeller systems receiving power from electric or other power sources located inside the vessel by way of shafts which extend through the hull of the vessel. The drive shaft for such systems usually passes through the vessel's hull at a rake angle in order to facilitate the layout of the vessel's propulsion plant equipment due to the typical hull geometry. Such angled shafting reduces propeller efficiency and often causes the propeller to protrude far beyond the hull of the ship making it susceptible to blade hits. Maintenance work to repair resulting bent or broken propeller blading or shafting is costly and requires dry dock facilities. In addition, severe blade hits can cause shaft or drive train damage which would require cuts into the hull or extensive engine room disassembly to repair and could even result in the loss of the ship at sea as a result of flooding or lack of maneuverability. Pump jets have recently been used to address some of the foregoing shortcomings of conventional systems. However, they do not address all of the shortcomings, nor do they offer any potential for improved overall efficiency.

The Hall et al. U.S. Pat. No. 5,301,624 discloses a SWATH vessel having a propeller at the rear of each pontoon which is driven by a shaft connected to an engine within the SWATH vessel. The Walters U.S. Pat. No. 4,936,237 discloses a dual hull vessel having a propeller housing mounted at the rear of each hull containing a propeller driven by a shaft extending into the hull.

The Veronesi et al. U.S. Pat. No. 5,252,875 discloses a pod-type shrouded propeller arranged to be affixed to the outside of a hull. The Pierro U.S. Pat. No. 3,708,251 shows a similar pod arrangement for a shrouded propeller. In the Taylor et al. U.S. Pat. No. 4,831,297 a submersible electric propulsion motor is described in which the propeller is integrated with a motor rotor.

The Rieben U.S. Pat. No. 5,679,037 shows a water craft having propeller housing portions on each side of the hull containing a stationary screw induction structure leading from an inlet to a propeller at the rear of the housing. According to the Garis, Jr. U.S. Pat. No. 5,078,628, a propulsor for marine vessels contains a rotor which is journaled in the hull of the vessel and has blades which extend outside the vessel's hull and are surrounded by a shroud to protect the blades. The rotor blades which project from the hull are driven by an electric motor mounted inside the hull. Stationary blades are positioned ahead of and following the rotating blades.

SUMMARY OF THE INVENTION

Accordingly, it is an object of the present invention to provide an integrated external electric drive propulsion arrangement for SWATH vessels which overcomes disadvantages of the prior art.

Another object of the invention is to provide an external electric drive propulsion arrangement for SWATH vessels having improved efficiency and greater convenience for repair and replacement.

These and other objects of the invention are obtained by providing a SWATH vessel having elongated pontoons with a propulsion module arrangement mounted externally at the rear of each pontoon having an internal passage and containing a fully enclosed permanent magnet motor driving a row of rotary blades to propel water through the internal passage from an inlet duct at the forward end of the module. The inlet duct is arranged to draw in a large proportion of the pontoon's boundary layer so as to avoid flow separation and maximize propulsive efficiency. Each propulsion unit is removably mounted and is preferably accessible through the stern of the module or through side access panels. To facilitate maneuverability flow reversing clamshells or thrust vectoring nozzles may be added to the propulsion module.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
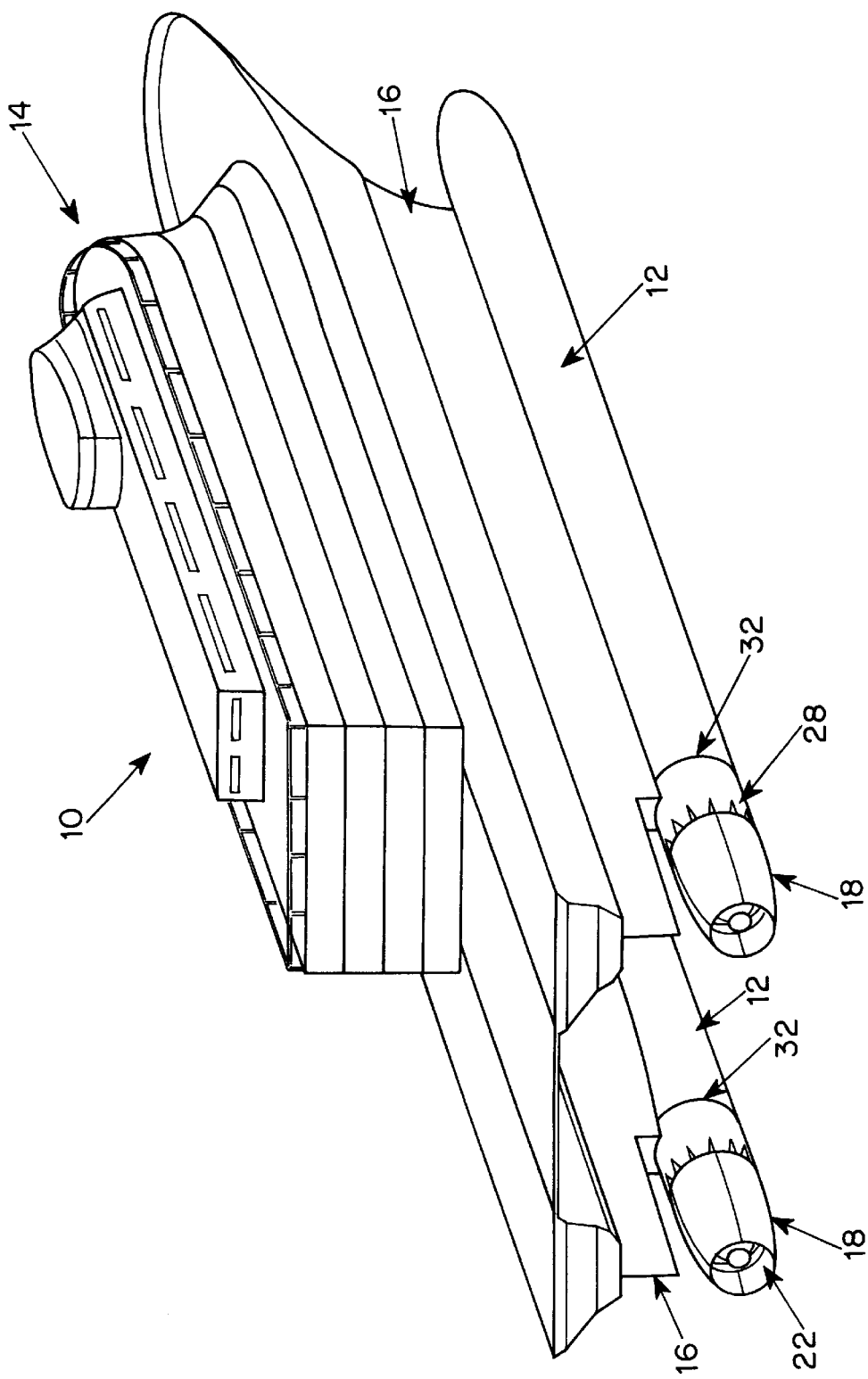
FIG. 1 is a perspective schematic view illustrating a representative embodiment of a SWATH vessel incorporating propulsion modules arranged in accordance with the invention.
Figure 2:
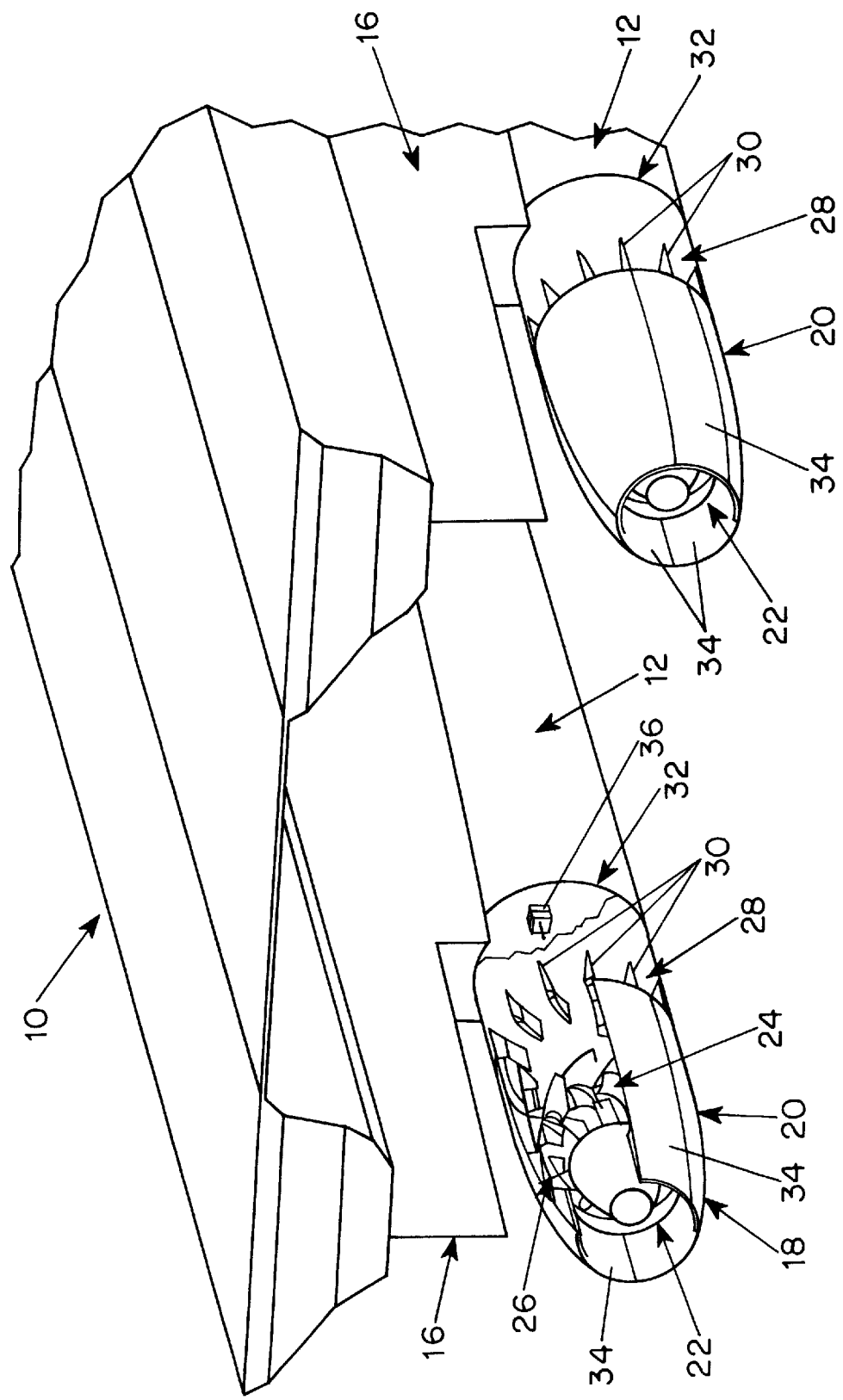
FIG. 2 is an enlarged fragmentary perspective view illustrating the propulsion module arrangements of FIG. 1 in greater detail.

In the typical embodiment of the invention shown in the drawings a small waterplane area twin hull (SWATH) vessel 10 has two pontoons 12 from which a vessel superstructure portion 14 is supported by vertical struts 16 so that only the pontoons 12 and lower portions of the supporting struts 16 are below the water line and the superstructure 14 is spaced a sufficient distance from the water line to normally avoid contact with the surface of the water. The pontoons 12 have substantially the same length as that of the vessel and are laterally spaced substantially the full width of the vessel to provide good stability when the vessel is under way. In conventional SWATH vessels of the type described for example in U.S. Pat. No. 5,301,624, propellers projecting from the rear of each pontoon are connected by a drive shaft to propulsion motors which are located either within the body of the pontoon or in the superstructure of the vessel and connected through a drive linkage to the drive shaft.

In accordance with the invention, the SWATH vessel 10 has an integrated embedded external electric drive propulsion module 18 removably mounted at the aft end of each of the pontoons 12. Each propulsion module 18 has a cowl 20 surrounding an internal passage 22 in the body of the module. An array of rotatable blades 24 in the passage 22 is arranged to rotate so as to drive water through the passage and is followed by a stationary row of blades 26 to straighten the flow of water driven by the rotating blades 24. The rotating blades are driven by a rim drive motor of the type described, for example, in the copending Eaves et al. application Ser. No. 09/004,433 filed in Jan. 8, 1998, now U.S. Pat. No. 5,967,749 the disclosure of which is incorporated by reference herein.

At the forward end of the cowl 20, which has substantially the same diameter as the pontoon 12, an adjacent region 28 of the outer surface of the pontoon is tapered inwardly to draw the boundary layer of water flowing along the pontoon's outer surface into the internal passage 22 in the module without causing flow separation in the manner described, for example, in the copending Chapman application Ser. No. 08/883,031 filed Jun. 26, 1997, now U.S. Pat. No. 6,082,670 the disclosure of which is incorporated herein by reference. Disposed within the opening formed between the inwardly tapered region 28 of the pontoon and the forward end of the cowl 20 is a circular array of stationary vanes 30 which guide and straighten the flow of water entering the passage 22 and also serve to block debris from entering the passage 20 and possibly damaging the blades 24 and 26.

Each propulsion module 18 is removably attached at a joint 32 at the aft end of the pontoon 12 and since the propulsion modules 18 have entirely self-contained drive motors, no shaft opening is required at the joint 32 between the pontoon 12 and the propulsion module 18. Consequently, the joint 32 provides a watertight closure for the pontoon and only electrical connectors 36 between the module 18 and the pontoon 12 are required to supply the power necessary for the propulsion module. Moreover, the modules 18 have removable access panels 34 to facilitate access to the interior of the module for repair.

With this arrangement, each propulsion module 18 can be accessed or removed from the SWATH vessel quickly and conveniently for repair or replacement without requiring any drydock facility. Moreover, no propeller blades project beyond the protective covering formed by the cowl 20 so that blade hits cannot occur to cause damage to the propulsion unit. Furthermore, even if the propulsion module 18 is struck so as to be damaged that will not result in damage to the pontoon 12 or the vessel 10 because there is no shaft extending into the pontoon and repair can be effected easily by removing the damaged propulsion module 18 from the pontoon without requiring any access to the interior of the pontoon or the vessel or any drydock facility.

If desired, the propulsion modules 18 can be designed to provide hydraulically operated side vent ducts which can be opened selectively to direct propulsive thrust to one side or the other to increase maneuverability of the vessel. Alternatively, or additionally, propulsion modules can be provided with flow-reversing clamshells or the like to reduce stopping distances. In addition, the bow shape of pontoon 12 and struts 14 can be designed so as to cause the period of the bow wave produced by motion of the pontoon through the water to have its peak crest as the wave passes the propulsion module inlet, thereby improving the cavitation performance of the propulsion module.

Although the invention has been described herein with reference to specific embodiments, many modifications and variations therein will readily occur to those skilled in the art. Accordingly, all such variations and modifications are included within the intended scope of the invention.

We claim:

1. A propulsion module for a SWATH vessel comprising:
   a module body arranged to be removably attached to the aft end of a pontoon for a SWATH vessel and having a longitudinal passage for water;
   a rim drive electric motor in the module body;
   a cowl member surrounding the module body;
   a row of rotatable blades within the longitudinal passage which are driven by the electric motor;
   a row of stationary blades within the longitudinal passage and positioned aft of the rotatable blades; and
   an inlet opening at the forward end of the cowl member arranged to draw into the longitudinal passage a boundary layer of water extending along a surface of a pontoon to which the propulsion module is attached.

2. A propulsion module according to claim 1 wherein the inlet opening extends circumferentially around the forward end of the cowl member so as to receive a boundary layer extending entirely around a pontoon to which the propulsion module is attached.

3. A propulsion module according to claim 1 including a plurality of vanes adjacent to the inlet opening positioned to block ingestion of objects into the longitudinal passage in the module body.

4. A propulsion module according to claim 1 including a removable access panel permitting access to the interior of the module body.

5. A propulsion module according to claim 1 including an electric power connectors to provide a sealed electrical connection between the propulsion module and a pontoon to which it is affixed for supplying electric power to the rim drive electric motor.

6. A SWATH vessel comprising:
   a plurality of pontoons, a superstructure, and a plurality of support members supporting the superstructure from the plurality of pontoons; and,
   a plurality of propulsion modules, one propulsion module being removably attached at the aft end of each of the plurality of pontoons;
   each of the propulsion modules comprising a rim drive electric motor, a plurality of rotatable vanes driven by the rim drive electric motor to propel water through the longitudinal passage;
   a cowl member surrounding the rim drive electric motor;
   an inlet opening at the forward end of the cowl member arranged to draw in a boundary layer of water flowing along the pontoon to which the propulsion module is attached; and
   a row of stationary vanes in the longitudinal passage located aft of the rotating blades.

7. A SWATH vessel according to claim 6, wherein the inlet opening extends circumferentially around the forward end of the cowl member so as to receive a boundary layer extending entirely around the pontoon to which the propulsion module is attached.

8. A SWATH vessel according to claim 6 including a plurality of vanes adjacent to the inlet opening which are positioned to block ingestion of objects into the longitudinal passage.

9. A SWATH vessel according to claim 6 including a removable access panel permitting access to the interior of the module body.

10. A SWATH vessel according to claim 6 wherein each propulsion module is removably attached to a corresponding pontoon at a joint which provides a watertight closure for the pontoon.

11. A SWATH vessel according to claim 10 including an electric power connection at the joint between the propulsion module and the pontoon to which it is affixed for supplying electric power to the rim drive electric motor.

* * * * *